H. P. TWISTERN.
WEED CUTTING ATTACHMENT FOR CULTIVATORS.
APPLICATION FILED SEPT. 18, 1919.
1,335,410. Patented Mar. 30, 1920.
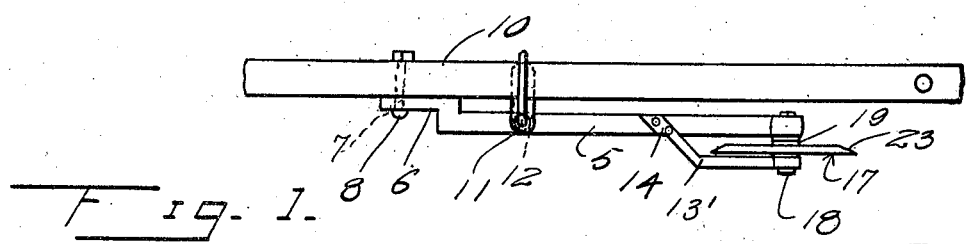
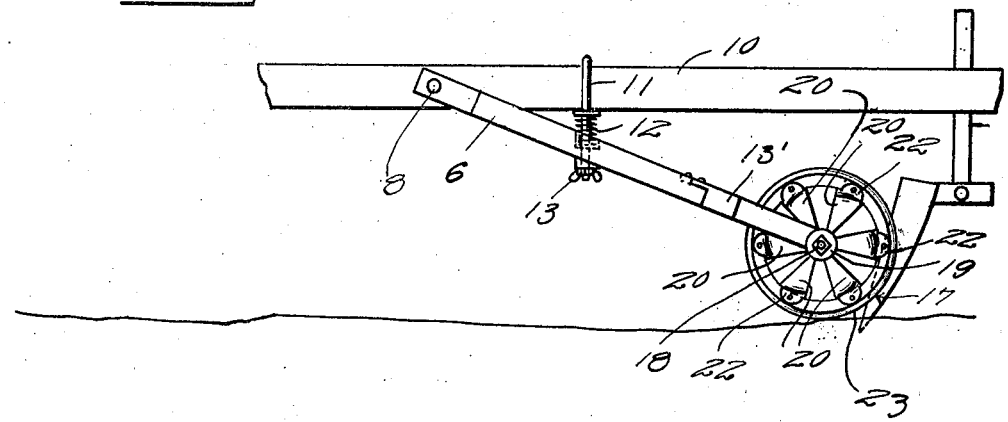
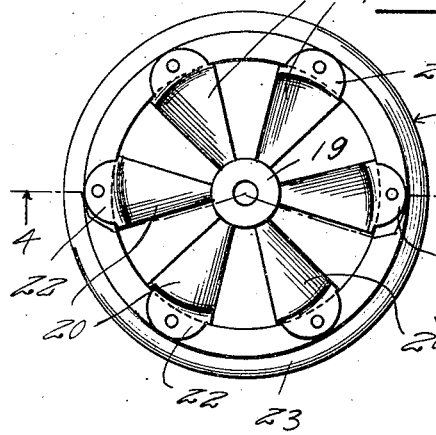
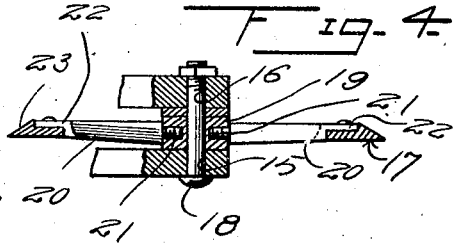
Inventor
H. P. Twistern
By Watson E. Coleman
Attorney

UNITED STATES PATENT OFFICE.

HANS P. TWISTERN, OF WOODSTOCK, ILLINOIS.

WEED-CUTTING ATTACHMENT FOR CULTIVATORS.

1,335,410.      Specification of Letters Patent.      Patented Mar. 30, 1920.

Application filed September 18, 1919. Serial No. 324,316.

*To all whom it may concern:*

Be it known that I, HANS P. TWISTERN, a citizen of the United States, residing at Woodstock, in the county of McHenry and State of Illinois, have invented certain new and useful Improvements in Weed-Cutting Attachments for Cultivators, of which the following is a specification, reference being had to the accompanying drawings.

This invention relates to a weed cutting attachment for cultivators and has for its object to provide a device of this character, capable of being readily attached to the beam of a cultivator and easily adjusted to the desired position.

Another object is to provide a device of this character having a cutting member, the periphery of which is sharpened, the cutting member also including a plurality of pitched blades which distribute the soil pulverized by the cutting edge.

Another object of the invention is to provide a cutting member having pitched blades which not only serve to distribute the soil pulverized by the cutting edge, but act as spokes to connect the cutting member to its hub.

These objects are attained by the mechanism illustrated in the accompanying drawings, in which—

Figure 1 is a side elevation of the attachment in position on the cultivator.

Fig. 2 is a top plan view of the attachment.

Fig. 3 is a detail view of the cutting device.

Fig. 4 is a sectional view on line 4—4 of Fig. 3.

Referring to the drawings, 5 designates a supporting arm, one end of which is offset as at 6 and is provided with an aperture 7, through which a bolt 8 is passed for pivotally connecting the end of the supporting arm to the cultivator 10. Slidably disposed through the intermediate portion of the supporting arm 5 is a holding hook 11 provided with a spring 12 and at its lower end with a set screw 13. This holding hook is intended to engage the cultivator beam, to hold the attachment in the desired position to prevent unnecessary movement of the attachment in operation.

A bracket including an arm 13' has one end 14 secured to the supporting arm 5, the remaining end having an opening 15 which registers with an opening 16 in the free end of the supporting arm 5, the bracket 13' coöperating with the free end of the supporting arm to provide a substantial support for the cutting device 17, which is supported between the bracket 13' and supporting arm 5 by means of the bolt 18.

The cutting device comprises a hub 19, which is rotatably mounted on the bolt 18 and holds the cutting device in spaced relation to the bracket 13' and supporting arm 5. A plurality of tapering skewed blades 20 are threaded at one end 21 into the hub 19. The broad ends 22 of the blades 20 include flanges which are riveted to an annular cutting blade 23. The edge of this annular cutting blade is sharpened and is intended to engage weeds and lumps of soil, to destroy the weeds and pulverize the soil. The pitched blades 20 serve to distribute the soil pulverized and picked up by the annular cutting blade 23.

The novel construction of the annular cutting blade not only destroys the weeds and treats the soil, but prevents the pitched blades from coming into contact with the plants.

What is claimed is:

1. In a device of the character described, a supporting arm pivotally connected at one end to a cultivator beam, adjustable holding means carried by the arm and arranged to engage the cultivator beam, an arm carried by the other end portion of said supporting arm, said last mentioned arm coöperating with the end portion of the supporting arm to provide a bracket, and ground engaging cutting means rotatable in said bracket.

2. In a device of the class described, a frame, cutting means mounted in said frame, said means comprising a hub, skewed blades including means at one end for attachment to the hub, an annular cutting member, and means carried by the other ends of said skewed blades for attachment to the annular cutting member.

3. In a device of the class described, a frame, cutting means mounted in said frame, said means comprising a hub, skewed tapering blades including means at their narrow ends for attachment to the hub, an annular cutting blade having a sharpened outer edge, and a flange on the broad ends of the skewed tapering blades for attachment to the annular cutting blade.

In testimony whereof I hereunto affix my signature.

HANS P. TWISTERN.